United States Patent
Kang et al.

(10) Patent No.: US 8,487,892 B2
(45) Date of Patent: Jul. 16, 2013

(54) TOUCH SCREEN PANEL AND DISPLAY DEVICE HAVING THE SAME

(75) Inventors: Sung-Ku Kang, Yongin (KR); Hwan Hee Jeong, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 257 days.

(21) Appl. No.: 12/926,795

(22) Filed: Dec. 9, 2010

(65) Prior Publication Data

US 2011/0242020 A1    Oct. 6, 2011

(30) Foreign Application Priority Data

Apr. 1, 2010    (KR) .......................... 10-2010-0029947

(51) Int. Cl.
*G06F 3/041* (2006.01)

(52) U.S. Cl.
USPC .......................................... 345/173

(58) Field of Classification Search
USPC .......................................... 345/173
See application file for complete search history.

(56) References Cited

U.S. PATENT DOCUMENTS

| 2002/0000979 A1* | 1/2002 | Furuhashi et al. ............. 345/173 |
| 2007/0013648 A1* | 1/2007 | Yamaguchi et al. .......... 345/102 |
| 2008/0143683 A1* | 6/2008 | Hotelling ....................... 345/173 |

FOREIGN PATENT DOCUMENTS

| JP | 2003-288165 A | 10/2003 |
| KR | 10 2007-0060816 A | 6/2007 |
| KR | 10-893498 B1 | 4/2009 |

OTHER PUBLICATIONS

Korean Office Action in KR 10-2010-0029947, dated Sep. 27, 2011 (Kang, et al.).

* cited by examiner

*Primary Examiner* — Quan-Zhen Wang
*Assistant Examiner* — Nelson D Runkle, III
(74) *Attorney, Agent, or Firm* — Lee & Morse, P.C.

(57) ABSTRACT

A touch screen panel includes first and second substrates disposed to face each other, conductive sensing cells in a touch active area on a first surface of the first substrate that faces the second substrate, a black matrix in a non-touch active area on a first surface of the second substrate that faces the first substrate, the non-touch active area being positioned outside the touch active area, an adhesive layer between the first and second substrates, the adhesive layer joining the first and second substrates together, and an insulating layer in the touch active area on the first substrate, the insulating layer covering the conductive sensing cells and overlapping a concave portion formed on the first surface of the second substrate by the black matrix.

10 Claims, 3 Drawing Sheets

(a)

(b)

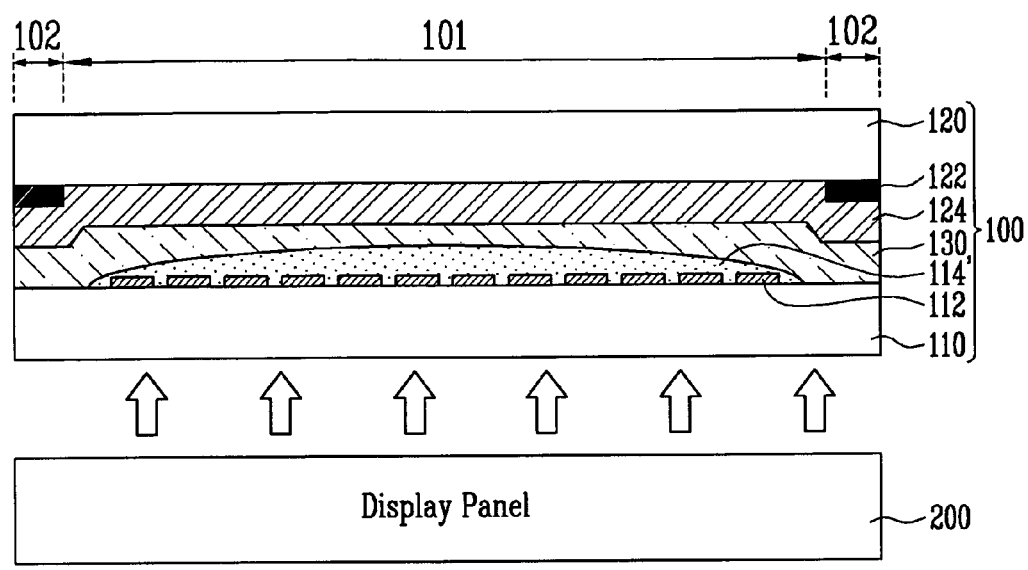

TOUCH SCREEN PANEL AND DISPLAY DEVICE HAVING THE SAME

BACKGROUND

1. Field

Embodiments relate to a touch screen panel and a display device having the same.

2. Description of the Related Art

A touch screen panel may be used as an input device that selects, using a user's hand or an object to input commands of the user, contents displayed on a screen. The touch screen panel may be provided on a front face of a display, and may convert positions directly contacting the user's hand or the object into electrical signals. Accordingly, the instruction selected at the contact point may be received as an input signal. The touch screen panel may replace a separate input device, such as a keyboard and a mouse. Thus, the use of the touch screen panel is expanding.

SUMMARY

It is a feature of an embodiment to provide a touch screen panel having a structure in which the production of air bubbles is minimized when upper and lower substrates are joined together, and a display device having the touch screen panel.

At least one of the above and other features and advantages may be realized by providing a touch screen panel, including first and second substrates disposed to face each other, conductive sensing cells in a touch active area on a first surface of the first substrate that faces the second substrate, a black matrix in a non-touch active area on a first surface of the second substrate that faces the first substrate, the non-touch active area being positioned outside the touch active area, an adhesive layer between the first and second substrates, the adhesive layer joining the first and second substrates together, and an insulating layer in the touch active area on the first substrate, the insulating layer covering the conductive sensing cells and overlapping a concave portion formed on the first surface of the second substrate by the black matrix.

The insulating layer may be formed of a transparent organic insulating material.

The insulating layer may have has a center portion formed higher than a peripheral portion thereof so as to have a slope.

The touch screen panel may further include an anti-scatter film entirely covering the first surface of the second substrate.

The adhesive layer may be formed of an optically clear adhesive.

The insulating layer may be positioned inside a region defined by the black matrix.

At least one of the above and other features and advantages may also be realized by providing a display device, including a display panel for displaying images, and a touch screen panel positioned on the display panel to receive a touch input, the touch screen panel including first and second substrates disposed to face each other, conductive sensing cells in a touch active area on a first surface of the first substrate that faces the second substrate, a black matrix in a non-touch active area on a first surface of the second substrate that faces the first substrate, the non-touch active area being positioned outside the touch active area, an adhesive layer between the first and second substrates, the adhesive layer joining the first and second substrates together, and an insulating layer in the touch active area on the first substrate, the insulating layer covering the conductive sensing cells and overlapping a concave portion formed on the first surface of the second substrate by the black matrix.

The insulating layer may be formed of a transparent organic insulating material.

The insulating layer may have a center portion formed higher than a peripheral portion thereof so as to have a slope.

The second substrate may be a window substrate that is positioned at the uppermost portion of the display device and comes in direct contact with a contact object for the touch input.

BRIEF DESCRIPTION OF THE DRAWINGS

The above and other features and advantages will become more apparent to those of skill in the art by describing in detail example embodiments with reference to the attached drawings, in which:

FIG. 3 illustrates a sectional view of a display device having a touch screen panel according to another embodiment.

DETAILED DESCRIPTION

Figure 1:
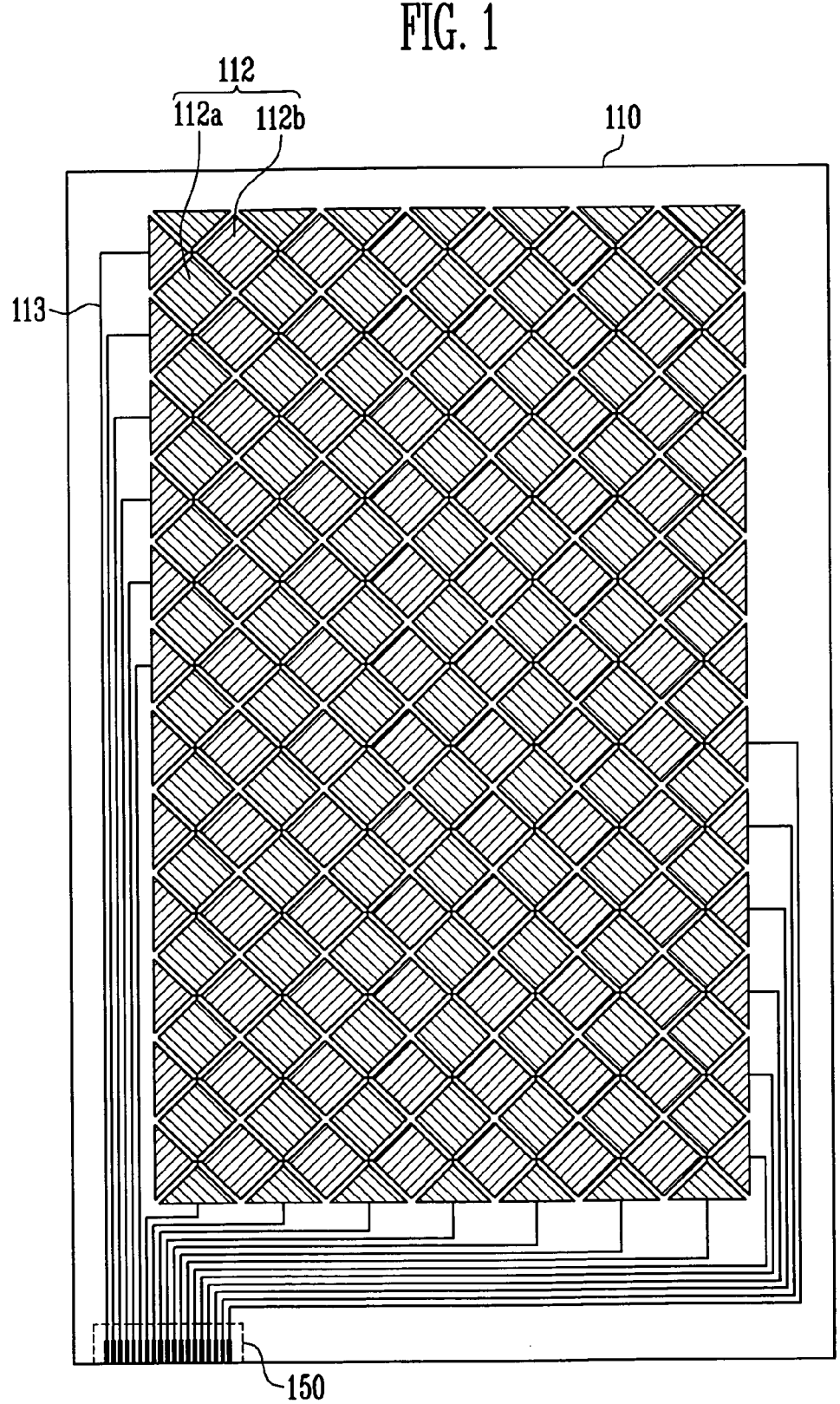
FIG. 1 illustrates a schematic plan view of an example touch screen panel.

Korean Patent Application No. 10-2010-0029947, filed on Apr. 1, 2010, in the Korean Intellectual Property Office, and entitled: "Touch Screen Panel and Display Device Having the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Also, when an element is referred to as being "connected to" another element, it can be directly connected to the another element or be indirectly connected to the another element with one or more intervening elements interposed therebetween. Like reference numerals refer to like elements throughout.

FIG. 1 illustrates a schematic plan view of an example touch screen panel.

In the example shown in FIG. 1, the touch screen panel includes a transparent substrate 110, a plurality of conductive sensing cells 112 formed on the transparent substrate 110, and position detecting lines 113 for connecting the conductive sensing cells 112 to an external drive circuit through a pad portion 150.

The transparent substrate 110 is a base component of the touch screen panel, and may be formed using a transparent substrate material such as glass. Here, the term "transparency" includes not only 100% transparency but also transparency having a high optical transmittance.

The conductive sensing cells 112 may be formed, e.g., from a transparent electrode material such as indium tin oxide (ITO), in a touch active area on one surface of the transparent substrate 110. In the example shown in FIG. 1, the conductive sensing cells 112 include first sensing cells 112a connected in a first direction and second sensing cells 112b connected in a second direction.

In the example shown in FIG. 1, the first sensing cells 112a are formed to be connected along the first direction, e.g., the column line direction. Thus, column lines of the first sensing cells 112a are connected to some of the position detecting lines 113, respectively. The second sensing cells 112b are formed to be connected along the second direction, e.g., the row line direction, different from the first direction between the first sensing cells 112a so that the first and second sensing cells 112a and 112b are insulated from each other. Thus, row lines of the second sensing cells 112b are connected to some of the position detecting lines 15, respectively.

The first and second sensing cells 112a and 112b may be positioned in the same layer, and may be respectively connected along the first and second directions by first and second connection patterns insulated from each other with an insulating layer interposed therebetween. In another implementation, the first and second sensing cells 112a and 112b may be positioned in different layers with the insulating layer interposed therebetween.

The position detecting lines 113 may be used to connect the sensing cells 112 to an external drive circuit (not shown) such as a position detecting circuit through the pad portion 150.

The position detecting lines 113 may be disposed in a non-touch active area positioned outside the outline of the touch screen panel while avoiding the touch active area on which an image is displayed and a touch input is provided. The position detecting lines 113 may be formed from various materials, e.g., a low-resistance material such as molybdenum (Mo), silver (Ag), titanium (Ti), copper (Cu), aluminum (Al) or molybdenum/aluminum/molybdenum (Mo/Al/Mo), or the transparent electrode material used for forming the sensing cells 112.

The touch screen panel may be implemented as a capacitive touch screen panel. If a contact object, such as a user's hand or stylus pen, comes into contact with the touch screen panel, a change in capacitance based on a contact position may be transferred from the sensing cells 112 to the external drive circuit (not shown) via the position detecting lines 113 and the pad portion 150. Then, the change in capacitance may be converted into an electrical signal by X and Y input processing circuits (not shown) and the like, so that the contact position is detected.

Figure 2:
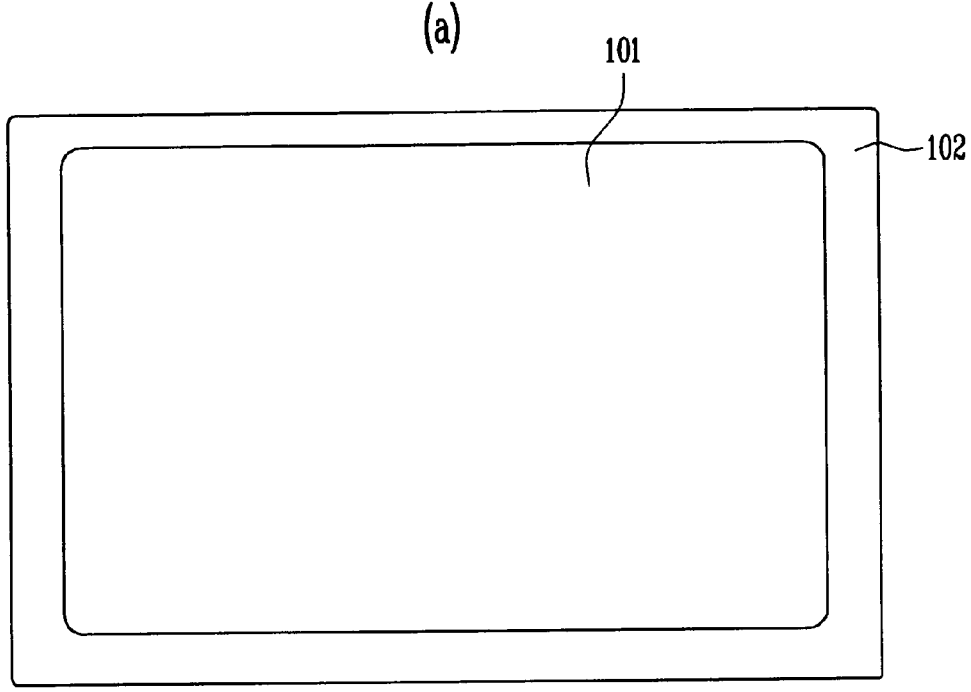
FIGS. 2(a) and (b) illustrate plan and sectional views, respectively, of a display device having a touch screen panel according to an embodiment.
Figure 2:
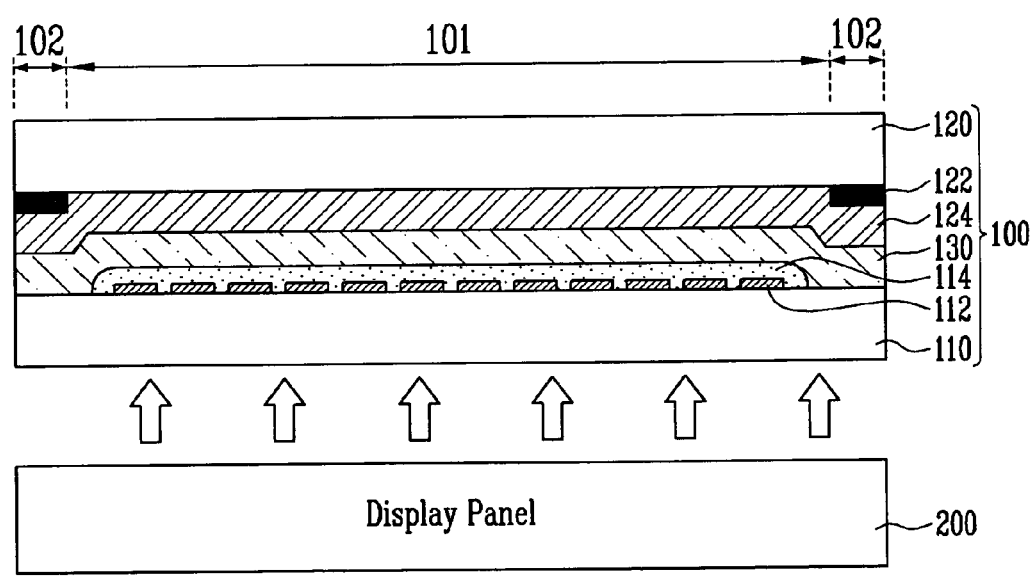

FIGS. 2(a) and (b) illustrate plan and sectional views, respectively, of a display device having a touch screen panel according to an embodiment.

Referring to FIG. 2(b), the display device may include a display panel 200 for displaying images, and a touch screen panel 100 positioned on the display panel 200 to receive a touch input.

Various display panels, e.g., an organic light emitting display panel, a liquid crystal display panel, etc., may be used as the display panel 200. The configurations of the display panels are techniques known in the art. Therefore, the detailed description of the configuration of the display panel 200 will be omitted.

The touch screen panel 100 may include first and second substrates 110 and 120 disposed to face each other, conductive sensing cells 112 and an insulating layer 114 formed on the first substrate 110, a black matrix 122 and an anti-scatter film (ASF) 124 formed on or attached to the second substrate 120, and an adhesive layer 130 that allows the first and second substrates 110 and 120 to be joined together. In the example shown in FIG. 2(b), the first and second substrates 110 and 120 are lower and upper substrates of the touch screen panel 100, respectively.

Referring to FIG. 2(a), a touch active area 101 and a non-touch active area 102 positioned outside the outline of the touch active area 101 may be defined on the first and second substrates 110 and 120.

The touch active area 101 may be an area in which the conductive sensing cells 112 for receiving a touch input are disposed. The touch active area 101 may be disposed to overlap with a display area of the display panel 200. That is, the touch active area 101 may be set in a screen area of the display device.

The non-touch active area 102 may be disposed outside the outline of the touch active area 101, i.e., the outline of the screen area. The non-touch active area 102 may be disposed to overlap with lines including the position detecting lines 113 shown in FIG. 1.

In the description of the present embodiment, the black matrix 122 and the ASF 124, formed on the second substrate 120, are considered as components of the touch screen panel 100. However, they may be separate components from the touch screen panel 100.

The second substrate 120 may be formed as a window substrate disposed the uppermost portion of the display device. When the second substrate 120 is considered as a separate component from the touch screen panel 100, the display device may include a display panel 200, a touch screen panel 100 positioned on the display panel 200, and a window that is positioned on the touch screen panel and includes a second substrate 120 having a black frame formed by a black matrix 122.

The first substrate 110 may be a transparent substrate that becomes a base component of the touch screen panel 100. For example, the conductive sensing cells 112 may be formed on the first substrate 110.

The conductive sensing cells 112 may be formed on one surface of the first substrate 110, particularly, an upper surface of the first substrate 110 that faces the second substrate. The conductive sensing cells 112 may be arranged in the touch active area 101.

The conductive sensing cells 112 may be formed of a transparent electrode material to which light is transmitted from the display panel 200 disposed therebelow. A touch event may be sensed as an input signal through the conductive sensing cells 112.

As shown in FIG. 1, the row and column lines of the conductive sensing cells 112 may be connected to the position detecting lines 113, respectively. However, for convenience of illustration, the connection patterns through which the conductive sensing cells 112 are connected on each of the row or column lines, the insulating layer interposed between the connection patterns, the position detecting lines 113, and the like will be omitted in FIG. 2.

The insulating layer 114 may be formed on the conductive sensing cells 112. The insulating layer 114 may be formed in the touch active area 101 on the first substrate 110 so as to cover the conductive sensing cells 112. For example, the insulating layer 114 may be disposed to overlap with a concave portion formed at one surface of the second substrate 120 due to the step caused by the black matrix 122. Thus, the insulating layer 114 may be formed to be positioned in the inside of the black matrix 122. The concave portion may be a result of a thickness of the black matrix 122 at a peripheral region causing the peripheral region to be thicker than a central region, such that a concavity (cavity) is formed in the central region.

The insulating layer 114 may be formed of, e.g., a transparent organic insulating material. For example, the insulating layer 114 may be formed of an organic layer such as an acryl-based layer, an organic photoresist such as an acryl-based photoresist, a polyimide-based photoresist, or a siloxane-based photoresist, or the like.

The insulating layer 114 may be formed to have a height identical or similar to that of the concave portion formed at one surface of the second substrate 120 by the black matrix 122, so that the step caused by the black matrix 122 can be compensated. The insulating layer 114 may effectively fill the cavity.

The second substrate 120 may simultaneously serve as an upper substrate of the touch screen panel 100 and a window substrate disposed at the uppermost portion of the display device so that a contact object comes in direct contact therewith. The black matrix 122 may be formed at the second substrate 120.

The black matrix 122 may be formed in the non-touch active area 102 on one surface of the second substrate 120, i.e., the bottom surface of the second substrate 120 that faces the first substrate 110, using a screen printing technique or the like. Thus, the black matrix 122 may be disposed along the outline of the screen area (touch active area) to prevent patterns such as conductive lines from being visible and to form a black frame in the touch screen panel 100.

In an implementation, an overcoat layer (not shown) and the like may be further formed on the one surface of the second substrate 120, on which the black matrix 122 is formed.

The ASF 124 may be formed, for example, with a film of a transparent polymer material such as polyethylene terephthalate (PET), or the like. The ASF 124 may be attached to one surface of the second substrate 120, so that scattering is prevented. Thus, the ASF 124 may enhance the durability of the display device.

The ASF 124 may be entirely formed on the bottom surface of the second substrate 120 on which the black matrix 122 is formed. In another implementation, the ASF 124 may be attached to the top surface of the second substrate 120. In another implementation, the ASF 124 may be omitted.

The adhesive layer 130 may be interposed between the first and second substrates 110 and 120 so that they are joined together. The adhesive layer 130 may be formed of a transparent insulating adhesive with high light transmittance, e.g., an optically clear adhesive (OCA).

The first substrate 110 having the conductive sensing cells 112 formed thereon and the second substrate 120 having the black matrix 122 formed thereon may be joined together by aligning the first and second substrates 110 and 120, coating the adhesive on the first or second substrate 110 or 120, and then surface-pressing the first and second substrates 110 and 120.

The black matrix 122 may be formed to have a thickness of about 7 μm to about 20 μm along the outline on one surface of the second substrate 120 joined with the first substrate 110. The black matrix 122 may be formed using a printing technique. A step may be generated by the thickness of the black matrix 122, such that a concave portion is formed at the inside of the black matrix 122. In the present embodiment, the insulating layer 114 may be formed on the first substrate 110 to correspond to the concave portion. Thus, the production of air bubbles may be minimized when the first and second substrates 110 and 120 are joined together.

If the insulating layer 114 is not provided, air bubbles may be produced at a stepped portion of the second substrate 120 (in FIG. 2, a stepped portion of the ASF 124) due to the step generated by printing the black matrix 122 when the first and second substrates 110 and 120 are joined together. Such air bubbles may cause a failure. Therefore, in order to avoid air bubbles and improve reliability of the touch screen panel, the insulating layer 114 may be formed in the touch active area on the conductive sensing cells 112 formed on the first substrate 110 so as to correspond to the concave portion formed at the second substrate 120 by the black matrix 122, thereby compensating for the step caused by the black matrix 122. Accordingly, when the first and second substrates 110 and 120 are joined together, the production of air bubbles may be minimized, so that the manufacturing yield of the touch screen panel 100 (or the display device having the touch screen panel 100) can be enhanced, and the reliability of the display device can be ensured.

FIG. 3 illustrates a sectional view of a display device having a touch screen panel according to another embodiment. In the description of FIG. 3, components identical to those of FIG. 2 will be designated by like reference numerals, and their detailed descriptions will be omitted.

Referring to FIG. 3, an insulating layer 114' for compensating for a step caused by the black matrix 122 has a center portion formed higher than an outline thereof or peripheral portion thereof, so as to have a predetermined slope that is inclined from the center portion to the outline portion.

By forming the insulating layer 114' so that the center portion is higher than the outlying portion, air may be more easily exhausted when the first and second substrates 110 and 120, so that the production of air bubbles can be effectively prevented.

In a general touch screen panel, a lower substrate having conductive sensing cells formed in the touch active area and an upper substrate (or a window substrate of a display device) having a black matrix formed in a non-touch active area, defined outside the outline of the touch active area, may be joined together by an adhesive. During the joining, if air bubbles or air pockets result from a step caused by the black matrix, a failure may occur. As described above, a touch screen panel according to an example embodiment may include an insulating layer formed on conductive sensing cells formed on the lower substrate of the touch screen panel so as to correspond to the concave portion formed at the upper substrate by the black matrix, thereby compensating for the step caused by the black matrix. Accordingly, when the upper and lower substrates of the touch screen panel are joined together, the production of air bubbles may be minimized, thereby enhancing the yield of the touch screen panel and ensuring the reliability of the display device. Such a touch screen panel may be disposed on a display panel. In the touch screen panel, a touch active area, disposed to overlap with a display area of the display panel, may be formed to be transparent.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A touch screen panel, comprising:
   first and second substrates disposed to face each other;
   conductive sensing cells in a touch active area on a first surface of the first substrate that faces the second substrate;
   a black matrix in a non-touch active area on a first surface of the second substrate that faces the first substrate, the non-touch active area being positioned peripheral to the touch active area;
   an adhesive layer between the first and second substrates, the adhesive layer joining the first and second substrates together, the adhesive layer being in the touch active area and the non-touch active area; and
   an insulating layer, the insulating layer being only in the touch active area on the first substrate, the insulating layer covering the conductive sensing cells and overlapping a concave portion formed on the first surface of the second substrate by the black matrix, and the insulating layer being in a non-overlapping relationship with the black matrix.

2. The touch screen panel as claimed in claim 1, wherein the insulating layer is formed of a transparent organic insulating material.

3. The touch screen panel as claimed in claim 1, wherein the insulating layer has a center portion formed higher than a peripheral portion thereof so as to have a slope.

4. The touch screen panel as claimed in claim 1, further comprising an anti-scatter film entirely covering the first surface of the second substrate.

5. The touch screen panel as claimed in claim 1, wherein the adhesive layer is formed of an optically clear adhesive.

6. The touch screen panel as claimed in claim 1, wherein the insulating layer is positioned inside a region defined by the black matrix.

7. A display device, comprising:
   a display panel for displaying images; and
   a touch screen panel positioned on the display panel to receive a touch input, the touch screen panel including:
   first and second substrates disposed to face each other;
   conductive sensing cells in a touch active area on a first surface of the first substrate that faces the second substrate;
   a black matrix in a non-touch active area on a first surface of the second substrate that faces the first substrate, the non-touch active area being positioned peripheral to the touch active area;
   an adhesive layer between the first and second substrates, the adhesive layer joining the first and second substrates together, the adhesive layer being in the touch active area and the non-touch active area; and
   an insulating layer, the insulating layer being only in the touch active area on the first substrate, the insulating layer covering the conductive sensing cells and overlapping a concave portion formed on the first surface of the second substrate by the black matrix, and the insulating layer being in a non-overlapping relationship with the black matrix.

8. The display device as claimed in claim 7, wherein the insulating layer is formed of a transparent organic insulating material.

9. The display device as claimed in claim 7, wherein the insulating layer has a center portion formed higher than a peripheral portion thereof so as to have a slope.

10. The display device as claimed in claim 7, wherein the second substrate is a window substrate that is positioned at the uppermost portion of the display device and comes in direct contact with a contact object for the touch input.

* * * * *